Patented Dec. 12, 1933

1,939,621

UNITED STATES PATENT OFFICE 1,939,621

OIL-SOLUBLE BASIC SALTS OF AROYL-BENZOIC ACIDS

Herman Alexander Bruson, Germantown, Pa., assignor to The Resinous Products & Chemical Company, Inc., Philadelphia, Pa.

No Drawing. Application July 22, 1930
Serial No. 469,930

14 Claims. (Cl. 260—11)

The preparation of certain neutral salts of aroyl-benzoic acids and their use as siccatives in oils, paints, and varnishes, has already been described by me in a co-pending patent application, bearing Serial No. 378,184, filed July 13, 1929.

The present invention deals with basic salts and mixed basic and neutral salts of these and similar acids; the present salts differing both in chemical structure, physical properties, and in their percentage of metal from those previously described by me.

This invention relates to new compositions of matter comprising basic metal salts of organic acids having the general formula R—CO—R'—COOH where R and R' represent aromatic nuclei. These new salts are characterized by containing a free hydroxyl group attached to the metal radicle of the salt, as indicated by the following probable formula:

$$(R-CO-R'-CO-O)_x-M-(OH)$$

where R and R' represent aromatic nuclei; M represents a polyvalent metal and x stands for the number of effective valences of said metal.

By the expression "polyvalent metal" as used herein, is meant any one of the group comprising aluminum, barium, cadmium, calcium, cerium, chromium, copper, cobalt, iron, lead, magnesium, manganese, mercury, nickel, strontium, thallium, thorium, tin, uranium, vanadium, and zinc, as well as gold and platinum.

Basic salts of the above type may be prepared according to my invention, from organic acids having the general formula R—CO—R'—COOH where R and R' are aromatic nuclei; especially from such acids as are derivatives of benzoyl-o-benzoic acids, its isomers, and its homologues, such as are commonly obtained by condensing aromatic hydrocarbons with phthalic anhydride using anhydrous aluminum chloride as a catalyst.

Now I have found that when such organic acids all of which belong to the general class designated above, are treated with an alkaline hydroxide solution containing a sufficient excess of free alkali hydroxide to afford the molal equivalent of one free hydroxyl group; and if to the alkaline solution obtained there then be added in slight excess a solution of a water-soluble neutral salt of a polyvalent metallic element, a reaction occurs to form a basic metal salt of the aroyl-benzoic acid. This may be expressed by the following equation, using benzoyl-o-benzoic acid and cobalt sulfate as the interacting acid and salt.

In order to carry out this reaction, it has been found advisable to effect the double decomposition in the presence of water and an inert organic liquid which forms a two-layer system with water; such as ether, toluene, ethylene dichloride, or other suitable solvent which is capable of dissolving the basic metal salt that is formed. By this means, the tendency to form cobalt hydroxide in the above reaction is almost completely eliminated, since the basic cobalt benzoyl-o-benzoate dissolves immediately in the organic solvent as fast as it is precipitated. The equilibrium of the reaction is thus always in favor of the basic cobalt salt formation rather than that of cobalt hydroxide formation.

The new polyvalent metal basic salts of the aroyl-benzoic acids obtained in this way are resinous masses which dissolve readily in many organic solvents such as acetone, benzol and toluol, and afford an excellent method of intimately incorporating compounds containing polyvalent metals with other organic substances where they may function, for example as siccatives in oils, paints, and varnishes, or as catalytic agents in the carrying out of other chemical reactions such as oxidation or hydrogenation.

I have also found that these basic salts form colloidal solutions in organic solvents, and are moreover miscible in all proportions with colloidized solutions of nitrocellulose so that they give clear solutions and clear films therewith, acting in this capacity as lacquer resins.

When dissolved in turpentine and admixed with drying oils such as linseed oil, china wood oil and the like, these salts in many cases act as siccatives and cause an accelerated drying of the oils. The basic cobalt, manganese, vanadium, cerium, lead, iron and uranium and nickle salts of the aroyl-benzoic acids are particularly suitable for this purpose, small amounts (.05–.1% metal) on the weight of the oil decreasing the drying rate from 24 hours to five or six hours.

Typical aroyl-benzoic acids which may be used as described above for conversion into basic salts having high solubility in organic solvents and in drying oils are readily prepared by condensing phthalic anhydride in the presence of anhydrous aluminum chloride with aromatic hydrocarbons such as ethyl-benzene, propyl-benzene, butyl-benzene, amyl-benzene, hexyl-benzene, capryl-benzene, p-cymene, xylenes, butyl-xylene, naphthalene, diphenyl, butyl-naphthalene and their alkylated hydrogenated, halogenated, or alkoxylated derivatives, and homologues.

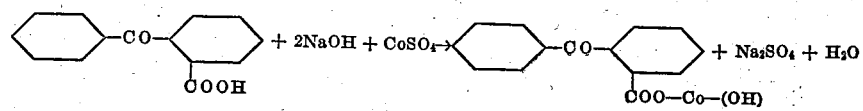

As illustrating my invention, the following examples are given:

Example 1

One mole of p-toluyl-o-benzoic acid,

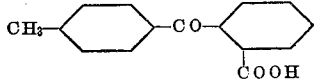

(made from toluene and phthalic anhydride) is dissolved in 1500 cc. of an aqueous sodium hydroxide solution containing 2 moles of NaOH (80 grams). An equal volume of toluene is then added and the mixture placed in a separatory funnel. A 25% aqueous solution of cobaltous sulfate in slight excess is then gradually added and the mixture thoroughly shaken. The basic cobaltous-p-toluyl-o-benzoate which first forms in the aqueous layer is thereby dissolved by the toluene, coloring the toluene layer deep blue. The latter is run off, washed, filtered, and the toluene evaporated off preferably by steam or vacuum distillation. The blue resinous mass which remains is dried in vacuo at 100° C. It forms a blue powder, readily soluble in toluene, and from its analysis, corresponds to the formula:

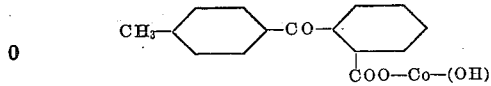

In a similar manner using aluminum sulfate, zinc chloride, lead nitrate, manganous chloride, or nickel chloride, the corresponding basic salts of these metals combined with the aroyl-benzoic acid may be obtained. The basic Al, Zn, and Pb salts are white, the Mn is cream colored and the Ni is green. The basic salts of the other polyvalent metals are produced similarly. All are soluble in toluene.

Example 2

Para-cymoyl-o-benzoic acid having the probable formula,

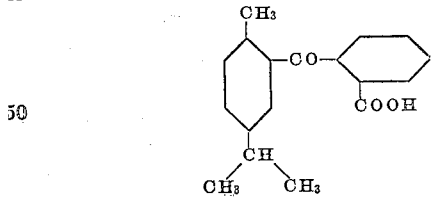

(made from p-cymene and phthalic anhydride) is neutralized with a 25% aqueous solution of potassium hydroxide until just pink to phenolphthalein indicator. The quantity of alkali used is carefully noted, and an additional equal quantity of the same alkali solution is added. This gives almost exactly one mole of free hydroxyl equivalent. An equal volume of ethylene dichloride is added to the mixture in a separatory funnel, and a slight excess of a 10% lead nitrate or lead acetate solution is allowed to run in with agitation. The basic lead-p-cymoyl-o-benzoate is at first precipitated in the upper layer but immediately redissolves in the lower ethylene dichloride layer, from which it is recovered by evaporating off the solvent. It forms a pale cream colored powder when anhydrous and is readily soluble in hot turpentine.

By using cerium nitrate, cobalt sulfate, uranium nitrate and other water-soluble salts of polyvalent metals, the corresponding basic salts may be obtained in like manner.

Example 3

Sec-amyl-benzoyl-o-benzoic acid,

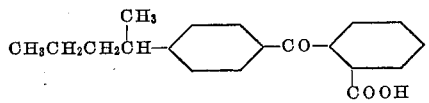

(made from sec-amyl benzene and phthalic anhydride) is treated with two molecular equivalents of sodium hydroxide and an equal volume of ether added. A solution of aluminum sulfate in slight excess is run in and the solution shaken. After separating the ether layer, it is washed, filtered, and the ether evaporated off. The aluminum basic amyl-benzoyl-o-benzoate forms a white powder readily soluble in organic solvents.

In a similar manner the other polyvalent metal basic salts may be prepared.

Instead of the acids given in the above examples, any of their homologues and substitution products may be used, so long as they possess the general formula R—CO—R'—COOH where R and R' are aromatic nuclei. The crude acids may also be used instead of the pure acids.

In place of the sodium hydroxide or potassium hydroxide as described above other hydroxides such as ammonium hydroxide, may also be used. Due however to its tendency to form ammono-complexes ammonium hydroxide is not always desirable.

Example 4

It is in some cases advantageous to prepare a mixed basic and neutral salt of the above acids by using quantities of alkali hydroxide intermediate between 1 and 2 molal equivalents. Thus 1 mole of capryl benzoyl-o-benzoic acid when treated with 1½ moles of sodium hydroxide and excess cobaltous chloride by the above process using ethylene dichloride, yields a mixture containing both the neutral and the basic cobalt capryl benzoyl-o-benzoate.

Various modifications in the above process may be made without departing from the scope of the present invention. Thus the aroyl-benzoic acids which may be used are not limited to the ortho-acids but may be extended as well to the meta-, and p-aroyl benzoic acids made by other processes, since the position of the aroyl group does not influence the formation of basic salts. Furthermore the use of organic solvents as an aid in obtaining pure basic salts is optional; satisfactory results being obtained without their use. The reactions may be carried out at temperatures other than room temperature. Other acids, belonging to the class R—CO—R'—COOH wherein R and R' are aromatic nuclei, and which are not specifically mentioned herein due to the great number of such acids, may likewise be employed. A study of a very large number of such acids has demonstrated that they all behave similarly. These acids include those where R is a monocyclic or polycyclic nucleus. Best results as far as solubility in oils, paints, varnishes and nitro-cellulose lacquers is concerned, are obtained from the basic metal salts of those aroyl-benzoic acids in which the group R is an alkyl-benzene nucleus the side chain of which contains more than three carbon atoms in a normal chain such as amyl benzoyl-benzoic acid, capryl benzoyl-benzoic acid and the like.

Having thus described my invention and illustrated several embodiments of the practical application thereof, what I claim as new and desire to secure by Letters Patent is:—

1. A basic cobalt salt of sec-amylbenzoyl-ortho-benzoic acid.
2. A basic manganese salt of sec-amylbenzoyl-ortho-benzoic acid.
3. A basic lead salt of sec-amylbenzoyl-ortho-benzoic acid.
4. A basic metal salt of an amylbenzoyl-o-benzoic acid.
5. A basic salt of a polyvalent metal and a ketonic monobasic acid of the formula R—CO—R'—COOH wherein R' is a benzene nucleus and R is an alkylated aromatic group; said basic salt being a resinous mass which when anhydrous is readily soluble in toluene.
6. A basic salt of a polyvalent metal and a ketonic monabasic acid of the formula R—CO—R'—COOH wherein R' is a benzene nucleus and R is an alkylated phenyl group; said salt being a resinous mass which when anhydrous is readily soluble in toluene.
7. A basic salt of a polyvalent metal and a ketonic monobasic acid of the formula

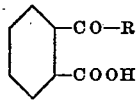

wherein R is an aromatic group; said basic salt being a resinous mass which when anhydrous is readily soluble in toluene.
8. A basic salt of a polyvalent metal and a ketonic monobasic acid of the formula

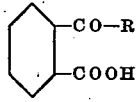

wherein R is an alkylated aromatic group; said basic salt being a resinous mass which when anhydrous is readily soluble in toluene.
9. A basic salt of a polyvalent metal and a ketonic monobasic acid of the formula

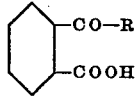

wherein R is an alkylated phenyl radicle; said basic salt being a resinous mass which when anhydrous is readily soluble in toluene.
10. A basic salt of a polyvalent metal and a ketonic monobasic acid of the formula

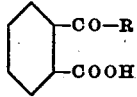

wherein R is an alkylated phenyl radicle the alkyl group of which contains more than three carbon atoms; said basic salt being a resinous mass which when anhydrous is readily soluble in toluene.
11. In the process of preparing a resin, the step which comprises mixing a ketonic monobasic acid of the general formula

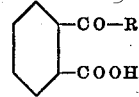

wherein R is an aromatic group; with a solution of more than one and not more than two molecular equivalents of an alkali metal hydroxide, and thereafter adding an aqueous solution of a salt of a polyvalent metal to precipitate a basic metal salt of the ketonic acid as a resin.
12. In the process of preparing a resin, the step which comprises mixing a ketonic monobasic acid of the general formula

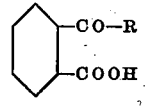

wherein R is an alkylated phenyl radicle, with a solution of more than one and not more than two molecular equivalents of an alkali metal hydroxide, and thereafter adding excess of a solution of a salt of a polyvalent metal in the presence of an organic liquid, which is immiscible with water but capable of dissolving the basic metal salt formed.
13. A process for preparing a resin which comprises mixing a ketonic monobasic acid of the general formula

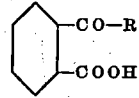

wherein R is an aromatic group with two molecular equivalents of sodium hydroxide in aqueous solution, thereafter adding ethylene dichloride and excess of a water-soluble neutral salt of a polyvalent metal; separating the ethylene dichloride layer, and recovering the resin therefrom.
14. A process for preparing a resin which comprises subjecting an aroylbenzoic acid to the action of between 1 and 2 molecular equivalents of an alkali metal hydroxide solution and excess of a water-soluble, neutral salt of a polyvalent metal, and dehydrating the precipitate obtained.

HERMAN ALEXANDER BRUSON.